United States Patent
Harada et al.

(10) Patent No.: US 11,659,504 B2
(45) Date of Patent: May 23, 2023

(54) TERMINAL, RADIO COMMUNICATION METHOD, AND BASE STATION

(71) Applicant: NTT DOCOMO, INC., Tokyo (JP)

(72) Inventors: Hiroki Harada, Tokyo (JP); Daiki Takeda, Tokyo (JP); Daisuke Murayama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 59 days.

(21) Appl. No.: 16/753,535

(22) PCT Filed: Oct. 6, 2017

(86) PCT No.: PCT/JP2017/036551
§ 371 (c)(1),
(2) Date: Apr. 3, 2020

(87) PCT Pub. No.: WO2019/069471
PCT Pub. Date: Apr. 11, 2019

(65) Prior Publication Data
US 2020/0314776 A1    Oct. 1, 2020

(51) Int. Cl.
*H04W 56/00*    (2009.01)
*H04L 5/00*    (2006.01)
*H04W 24/08*    (2009.01)
*H04W 72/0453*    (2023.01)
*H04W 72/23*    (2023.01)
*H04W 72/30*    (2023.01)

(52) U.S. Cl.
CPC ......... *H04W 56/001* (2013.01); *H04L 5/0094* (2013.01); *H04W 24/08* (2013.01); *H04W 72/0453* (2013.01); *H04W 72/23* (2023.01); *H04W 72/30* (2023.01)

(58) Field of Classification Search
None
See application file for complete search history.

(56) References Cited

U.S. PATENT DOCUMENTS

| 10,568,080 B2 * | 2/2020 | Han ..................... H04L 1/1657 |
| 2016/0119926 A1 * | 4/2016 | Sahara ............. H04W 72/0453 370/329 |
| 2017/0006586 A1 * | 1/2017 | Gulati ................... H04W 72/02 |
| 2018/0115430 A1 * | 4/2018 | Seo ........................... H04L 1/12 |

(Continued)

OTHER PUBLICATIONS

Extended European Search Report in counterpart European Application No. 17927976.5 dated Apr. 26, 2021 (10 pages).

(Continued)

*Primary Examiner* — Chirag G Shah
*Assistant Examiner* — Srinivasa R Reddivalam
(74) *Attorney, Agent, or Firm* — Osha Bergman Watanabe & Burton LLP

(57) ABSTRACT

A terminal is disclosed including a receiver that detects a synchronization signal (SS)/physical broadcast channel (PBCH) block including an SS and a PBCH; and a processor that determines a resource for monitoring a downlink control channel based on a field in the PBCH, and at least one of a first subcarrier spacing of the SS/PBCH block, a second subcarrier spacing of the resource, a frequency band, and an index of the SS/PBCH block. In other aspects, a radio communication method for a terminal and a base station are also disclosed.

10 Claims, 13 Drawing Sheets

NR-PBCH IN SS BLOCK

-CORESET BANDWIDTH AND FREQUENCY POSITION
-BANDWIDTH OF BAND FOR WHICH NR-PDSCH CAN BE SCHEDULED, AND FREQUENCY POSITION
...

NR-PDCCH IN CORESET

-RESOURCE ALLOCATION INFORMATION (ALLOCATION RB INDEX) OF NR-PDSCH
...

(56) References Cited

U.S. PATENT DOCUMENTS

| | | | |
|---|---|---|---|
| 2019/0069285 A1* | 2/2019 | Chandrasekhar | H04W 72/048 |
| 2019/0089474 A1* | 3/2019 | Ly | H04J 11/0069 |
| 2019/0273597 A1* | 9/2019 | Jiang | H04W 72/042 |
| 2020/0092946 A1* | 3/2020 | Xiong | H04L 5/0094 |
| 2020/0213960 A1* | 7/2020 | Jung | H04L 1/00 |
| 2020/0252890 A1* | 8/2020 | Irukulapati | H04W 72/005 |

OTHER PUBLICATIONS

Huawei et al.; "CORESET configuration and search space design"; 3GPP TSG RAN WG1 Meeting AH_NR#3, R1-1715395; Nagoya, Japan; Sep. 18-21, 2017 (10 pages).

Catt; "PDCCH search space design"; 3GPP TSG RAN WG1 Meeting AH_NR#3, R1-1715813; Nagoya, Japan; Sep. 18-21, 2017 (10 pages).

NTT DOCOMO, Inc.; "Discussion and evaluation on NR-PBCH design"; 3GPP TSG RAN WG1 Meeting #89, R1-1708439; Hangzhou, P.R. China; May 15-19, 2017 (8 pages).

LG Electronics; "RMSI delivery and CORESET configuration"; 3GPP TSG RAN WG1 Meeting #90, R1-1713125; Prague, Czech Republic; Aug. 21-25, 2017 (8 pages).

NTT DOCOMO, Inc.; "Discussion on remaining details on RMSI delivery"; 3GPP TSG RAN WG1 Meeting 90bis, R1-1718181; Prague, Czech Republic; Oct. 9-13, 2017 (7 pages).

International Search Report issued in PCT/JP2017/036551 dated Dec. 26, 2017 (1 page).

Written Opinion of the International Searching Authority issued in PCT/JP2017/036551 dated Dec. 26, 2017 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 Meeting #90bis; R1-1717461 "Discussion on Remaining Minimum System Information" vivo; Prague, Czech Republic; Oct. 9-13, 2017 (15 pages).

3GPP TSG RAN WG1 Meeting #90bis; R1-1717460 "Remaining aspects on NR-PBCH contents and payload" vivo; Prague, Czech Republic; Oct. 9-13, 2017 (7 pages).

Office Action issued in Japanese Application No. 2019-546516; dated Nov. 2, 2021 (11 pages).

Office Action issued in Japanese Application No. 2019-546516 dated Mar. 1, 2022 (12 pages).

Office Action issued in Indian Application No. 202037018027 dated Mar. 7, 2022 (7 pages).

Huawei, HiSilicon, "Remaining issues on bandwidth part", 3GPP TSG RAN WG1 Meeting #90bis, R1-1717077, Prague, Czech Republic, Oct. 9-13, 2017 (11 pages).

Office Action issued in counterpart Israeli Patent Application No. 273804 dated Nov. 14, 2022 (6 pages).

\* cited by examiner

TERMINAL, RADIO COMMUNICATION METHOD, AND BASE STATION

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger volume and higher sophistication of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) have been also studied.

In the legacy LTE systems (e.g., LTE Rel. 8 to 13), a user terminal (UE: User Terminal) detects a synchronization signal (a Primary synchronization Signal (PSS) and/or a Secondary Synchronization Signal (SSS)) by an initial access procedure (also referred to as cell search), synchronizes with a network (e.g., radio base station (eNode B (eNB)), and identifies a cell to connect (e.g., identifies the cell based on a cell Identifier (ID)).

Furthermore, after cell search, the user terminal receives a Master Information Block (MIB) transmitted on a broadcast channel (PBCH: Physical Broadcast Channel), and a System Information Block (SIB) transmitted on a Downlink (DL) shared channel (PDSCH: Physical Downlink Shared Channel), and obtains configuration information (that may be referred to as broadcast information or system information) for communicating with the network.

CITATION LIST

Non-Patent Literature

Non-Patent Literature 1: 3GPP TS 36.300 "Evolved Universalterrestrial Radio Access (E-UTRA) and Evolved Universalterrestrial Radio Access Network (E-UTRAN); Overall Description; Stage 2"

SUMMARY OF INVENTION

Technical Problem

It has been studied for future radio communication systems (e.g., NR or 5G) to define a resource unit including a synchronization signal and a broadcast channel as a synchronization signal block, and make an initial access based on the SS block. The synchronization signal is also referred to as a PSS and/or an SSS, or an NR-PSS and/or an NR-SSS. The broadcast channel is also referred to as a PBCH or an NR-PBCH. The synchronization signal block is also referred to as a Synchronization Signal block (SS block) or an SS/PBCH block.

The initial access that uses the SS blocks notifies a UE of information related to a domain to which a downlink control channel is configured by using the NR-PBCH that composes the SS block. The configuration domain of the downlink control channel (NR-PDCCH) is also referred to as a CORESET (Control Resource Set), a control resource set, a control subband, a search space set, a search space resource set, a control domain, a control subband or an NR-PDCCH domain.

However, how to include the information (also referred to as a CORESET configuration) related to the configuration domain of the downlink control channel in the NR-PBCH to notify the UE is not determined. Furthermore, how to notify a data allocation domain by a downlink control channel included in the configuration domain of the downlink control channel is not determined.

The present invention has been made in light of this point, and one of objects of the present invention is to provide a user terminal and a radio communication method that can appropriately notify a control channel configuration domain and/or a data allocation domain in a radio communication system that uses synchronization signal blocks.

Solution to Problem

A user terminal according to one aspect of the present invention includes: a reception section that receives a synchronization signal block including configuration information indicating a configuration of a control resource set; and a control section that controls determination of a radio resource of the control resource set based on at least one of identification information of the synchronization signal block, a subcarrier spacing of a downlink data channel scheduled on a downlink control channel in the control resource set, a subcarrier spacing of the synchronization signal block and a frequency band, and the configuration information.

Advantageous Effects of Invention

According to the present invention, it is possible to appropriately notify a control channel configuration domain and/or a data allocation domain in a radio communication system that uses synchronization signal blocks.

DESCRIPTION OF EMBODIMENTS

It has been studied for future radio communication systems (e.g., LTE Rel. 14 and subsequent releases, 5G or NR) to define a signal block (also referred to as an SS/PBCH block or an SS/PBCH block) including a synchronization signal (also referred to as an SS, a PSS and/or an SSS or an NR-PSS and/or an NR-SSS) and a broadcast channel (also referred to as a broadcast signal, a PBCH or an NR-PBCH). A set of one or more signal blocks will be also referred to as a signal burst (an SS/PBCH burst or an SS burst). A plurality of signal blocks in the signal burst are transmitted (also referred to as beam-swept) by different beams at different times.

The SS/PBCH block includes one or more symbols (e.g., OFDM symbols). More specifically, the SS/PBCH block may include a plurality of contiguous symbols.

A PSS, an SSS and an NR-PBCH may be arranged in one or more different symbols in the SS/PBCH block. For example, it has been also studied that the SS/PBCH block compose an SS/PBCH block by 4 or 5 symbols including the PSS of 1 symbol, the SSS of 1 symbol and the PBCH of 2 or 3 symbols.

A set of one or a plurality of SS/PBCH blocks may be referred to as an SS/PBCH burst. The SS/PBCH burst may include SS/PBCH blocks of contiguous frequency and/or time resources, or include SS/PBCH blocks of non-contiguous frequency and/or time resources. The SS/PBCH burst may be configured at a given periodicity (that may be also referred to as an SS/PBCH burst periodicity) or may be configured aperiodically.

Furthermore, one or a plurality of SS/PBCH bursts may be referred to as an SS/PBCH burst set (SS/PBCH burst series). The SS/PBCH burst set is periodically configured. A user terminal may control reception processing assuming that the SS/PBCH burst set is transmitted periodically (at an SS/PBCH burst set periodicity).

Figure 1A:
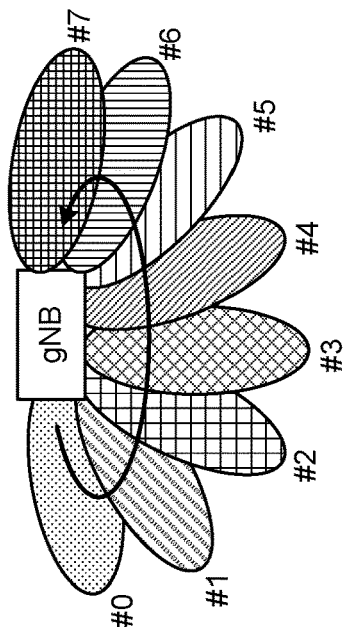
FIGS. 1A and 1B are diagrams illustrating one example of an SS burst set.
Figure 1B:
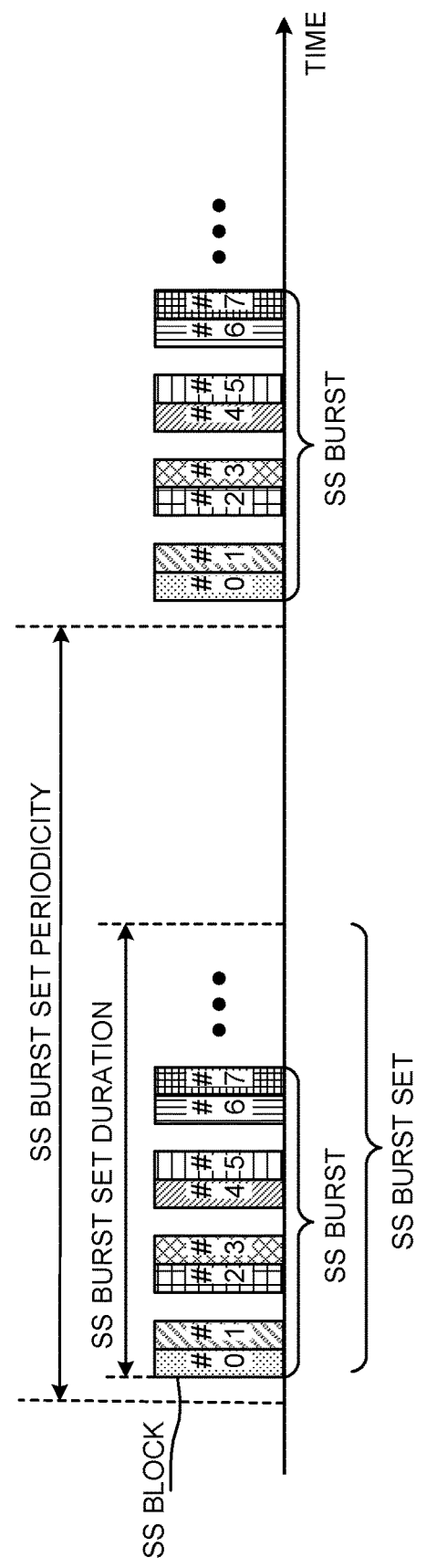

FIGS. 1A and 1B are a diagrams illustrating one example of an SS burst set. FIG. 1A illustrates one example of beam sweeping. As illustrated in FIGS. 1A and 1B, a radio base station (gNB) may temporarily differ (beam-sweep) beam directionality, and transmit different SS blocks by using different beams. In addition, FIGS. 1A and 1B illustrate the example where multiple beams are used. However, it is also possible to transmit an SS block by using a single beam.

As illustrated in FIG. 1B, the SS burst includes one or more SS blocks, and an SS burst set includes one or more SS bursts. For example, the SS burst includes 8 SS blocks #0 to #7 in FIG. 1B, yet is not limited to this. The SS blocks #0 to #7 may be transmitted by respectively different beams #0 to #7 (FIG. 1A).

As illustrated in FIG. 1B, the SS burst set including the SS blocks #0 to #7 may be transmitted without passing a given duration (e.g., 5 ms or less that is also referred to as an SS burst set duration). Furthermore, the SS burst set may be repeated at a given periodicity (e.g., 5, 10, 20, 40, 80 or 160 ms that is also referred to as an SS burst set periodicity).

In addition, in FIG. 1B, there is a given time interval between the SS blocks #1 and #2, #3 and #4, and #5 and #6, yet there may not be this time interval and the time interval may be provided between other SS blocks (e.g., between SS blocks #2 and #3 or #5 and #6). At the time interval, for example, a DL control channel (also referred to as a PDCCH: Physical Downlink Control Channel, an NR-PDCCH or Downlink Control Information (DCI)) may be transmitted, and/or a UL control channel (PUCCH: Physical Uplink Control Channel) may be transmitted from the user terminal. When, for example, each SS block includes 4 symbols, a slot of 14 symbols may include an NR-PDCCH of 2 symbols, two SS blocks, an NR-PUCCH corresponding to 2 symbols, and a guard time.

Furthermore, by using an NR-PBCH (or an NR-PBCH DMRS: DeModulation Reference Signal) included in the SS block, an index of an SS block (SS block index) is notified. The UE can learn the SS block index of the received SS block based on the NR-PBCH (or the NR-PBCH DMRS).

Furthermore, it has been studied that the radio base station notifies the UE of information related to a domain to which the downlink control channel (NR-PDCCH) is notified by using the NR-PBCH. The information related to the NR-PDCCH configuration domain may be referred to as a CORESET configuration, a control resource set configuration or an NR-PDCCH configuration.

Furthermore, it has been studied that the radio base station schedules system information (e.g., Remaining Minimum System Information (RMSI)) by using the NR-PDCCH. In this case, the UE receives the NR-PDCCH based on the control resource set configuration notified by the NR-PBCH, receives the NR-PDSCH scheduled by the NR-PDCCH, and obtains the system information.

The RMSI is information that is read during an initial access like System Information Block (SIB) 1 and an SIB 2 of LTE.

On the other hand, contents to be included in the NR-PBCH and notified is not specifically determined, and a problem is how to configure a specific notification method (the number of bits and contents) of the control resource set configuration to notify the UE.

Resources that are applicable to the NR-PBCH are also limited, and therefore it is desirable to suppress a payload at a requisite minimum for the NR-PBCH, enhance redundancy, improve a detection rate and suppress a configuration range and/or a granularity of the NR-PDCCH configuration. Particularly when a frequency band is low (a low frequency band is, for example, less than 6 GHz), the number of beams to be applied is small compared to a high frequency band (e.g., 6 GHz or more), and therefore the above request is desirably met.

Furthermore, when application of a multiple beam in the high frequency band is taken into account, it is desirable to configure the NR-PDCCH configuration in a wide range and/or at a fine granularity. For example, it is also considered to configure a common control resource set by using NR-PBCHs of different frequency bands and/or transmission timings.

Thus, when the control resource set configuration is notified by using the NR-PBCH included in the SS/PBCH block, it is desirable to perform control to satisfy at least one of that the number of bits used to notify the control resource set configuration in a frequency band less than a given frequency (e.g., 6 GHz) is suppressed, that the control resource set configuration is flexibly configured by taking multiple beam compatibility into account in a frequency band equal to or more than the given frequency (e.g., 6 GHz), and that the control resource set configuration is notified according to an SS burst set arrangement.

The contents (parameters) of the control resource set configuration to be notified by using the NR-PBCH includes a Bandwidth (BW) of the control resource set, a duration (e.g., the number of symbols), a start timing and a frequency position. At least one of items of contents is notified by using bit information included in the NR-PBCH.

It is considered to, when part or all of the bandwidth, the duration, the start timing and the frequency position of the control resource set are notified, define a table that associates the bit information included in the NR-PBCH and contents of the control resource set configuration. The UE can decide the control resource set configuration based on the bit information included in the NR-PBCH and the table configured in advance, and receive a downlink control channel transmitted by the control resource set.

For example, it is considered to define one table that defines the control resource set configuration associated with the bit information included in the NR-PBCH. In this case, irrespectively of a Subcarrier Spacing (SCS) and/or the frequency band used for transmission of an SS block, it is possible to notify the control resource set configuration by the bit information by using one common table.

Furthermore, how to configure a band of the CORESET for RMSI scheduling, and the band of the NR-PDSCH for RMSI has been studied.

For example, it has been studied that the CORESET for RMSI scheduling and the NR-PDSCH for RMSI do not need to be restricted to the bandwidth of the corresponding NR-PBCH or less.

Furthermore, it has been studied that the frequency position of the CORESET for RMSI scheduling and the frequency position of the NR-PDSCH for RMSI are restricted within a minimum UE bandwidth for a given frequency band. The minimum UE bandwidth is a maximum bandwidth that is supported by all UEs in a case where bandwidths supported by the UEs are different. If one of the CORESET for RMSI scheduling and the NR-PDSCH for RMSI has a larger bandwidth than the minimum UE bandwidth, the UE that does not support this bandwidth cannot read information that is necessary for an access and make the initial access, and therefore this restriction is necessary.

It has been studied that the CORESET for RMSI scheduling and the NR-PDSCH for RMSI are restricted within an initial active DL BWP. A BWP is one or more frequency bands (part bands) in a carrier (also referred to as a Component Carrier (CC) or a system band) used for DL and/or UL communication. The DL BWP is a BWP used for DL communication. The initial active DL BWP is a DL BWP configured during the initial access, and may be defined by a specification. The initial active DL BWP may be narrower than the minimum UE bandwidth.

Figure 2A:
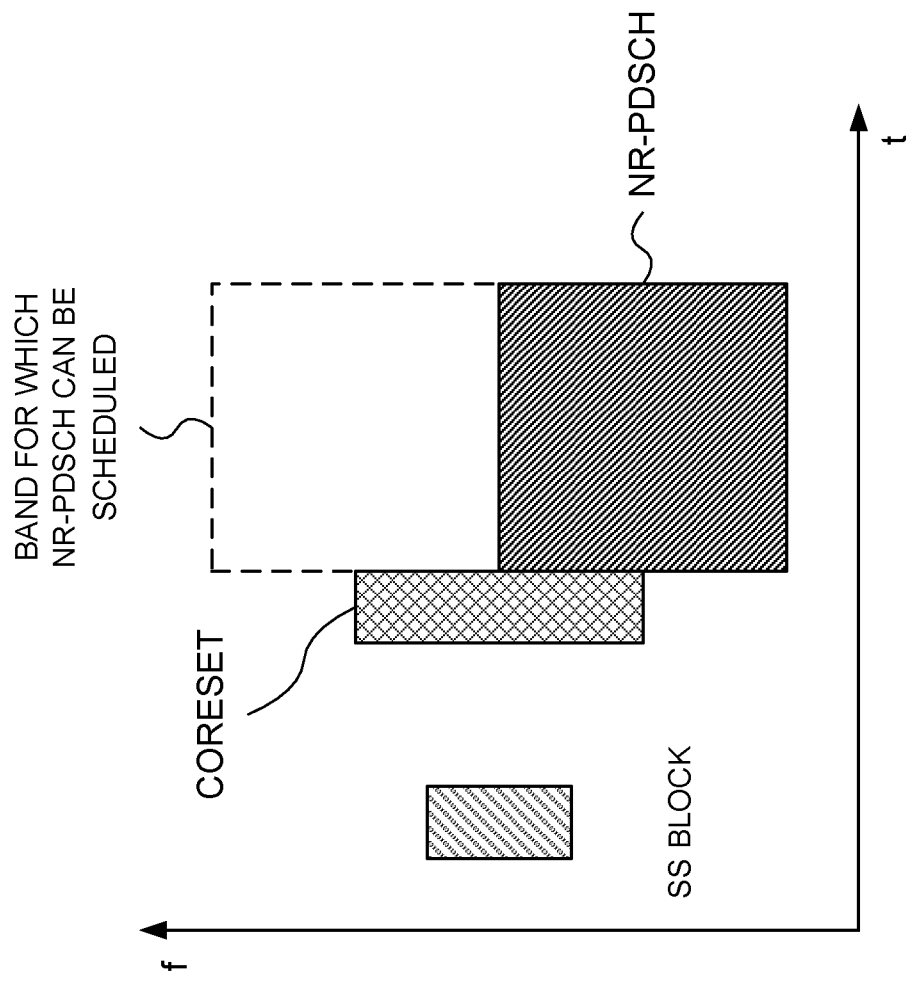
FIGS. 2A and 2B are diagrams illustrating one example of a CORESET band and a band for which an NR-PDSCH can be scheduled.

When, as illustrated in FIG. 2A, the band of the CORESET (CORESET band) for RMSI scheduling and a band (allocatable band) for which the NR-PDSCH can be scheduled are individually defined, the CORESET band and the allocable band need to be individually notified to the UE or individually defined by the specification.

For example, a resource allocation bit in DCI in the PDCCH in the CORESET indicates which RB is used for the PDSCH by using an RB index. Therefore, the UE needs to learn the band for which the NR-PDSCH can be scheduled.

Figure 2B:
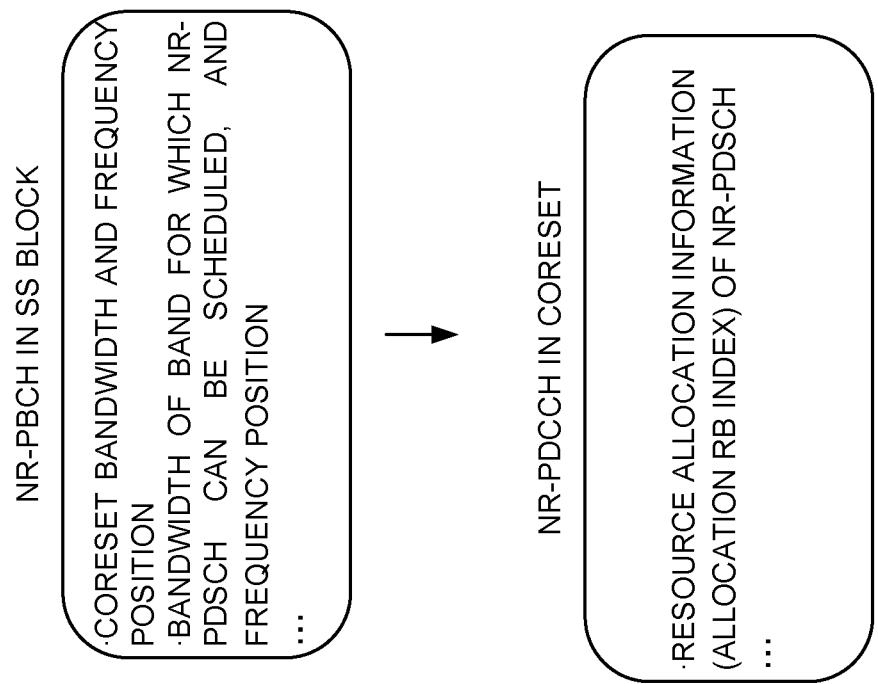

When, for example, the NR-PBCH notifies the CORESET band (the bandwidth and the frequency position) and the allocatable band (the bandwidth and the frequency position), and the NR-PDCCH notifies resource allocation information (frequency position) of the NR-PDSCH for RMSI as illustrated in FIG. 2B, a problem is that the number of bits that is necessary for notification in the NR-PBCH increases.

Furthermore, how CORESET configuration information indicating the CORESET configuration for RMSI scheduling is notified by the NR-PBCH has been studied. For example, following options 1 to 3 of the number of CORESETs instructed in the NR-PBCH in each SS block have been studied.

Figure 3A:
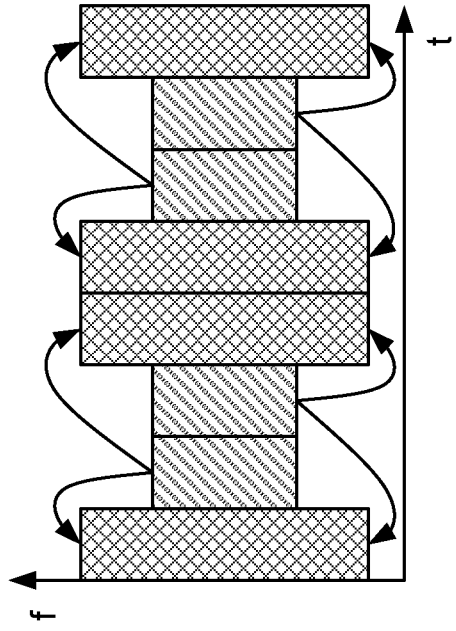
FIGS. 3A to 3C are diagrams illustrating one example of a CORESET configuration information notification method.

Option 1: One NR-PBCH in one SS block configures one CORESET for RMSI. In FIG. 3A, each of four SS blocks indicates a configuration of one CORESET associated with each of the four SS blocks. This means that the CORESET configuration may be specific to each SS block.

In this case, it is possible to suppress the number of bits that is necessary in the NR-PBCH. Furthermore, a relative position of the CORESET associated with each SS block may differ per SS block, so that it is possible to flexibly indicate the CORESET per SS block. However, the UE needs to read the NR-PBCH every time to learn CORESETs associated with different SS blocks, and therefore a processing load becomes high.

Figure 3B:
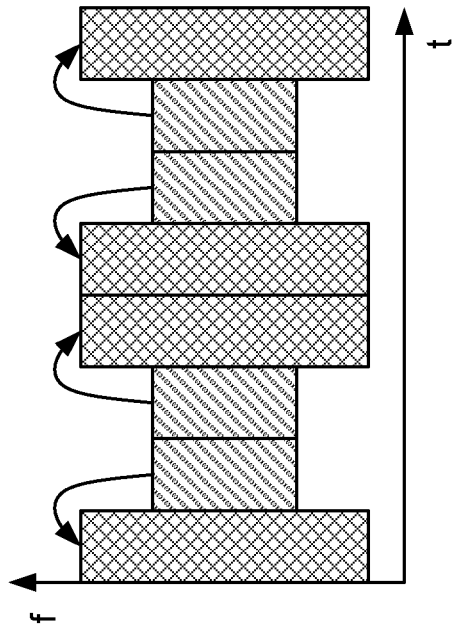

Option 2: One NR-PBCH in one SS block configures all CORESETs for RMSI in a cell. In FIG. 3B, each of four SS blocks indicates all configurations of four CORESETs.

In this case, the UE can learn all CORESETs associated with each SS block by reading one NR-PBCH. Furthermore, it is possible to flexibly indicate a CORESET per SS block. However, the number of bits that is necessary in the NR-PBCH increases.

Figure 3C:
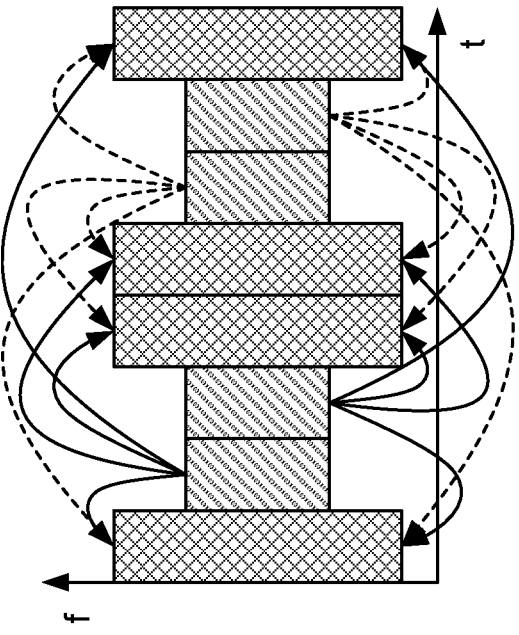

Option 3: One NR-PBCH in one SS block configures a plurality of CORESETs for RMSI. In this regard, a plurality of CORESETs are not all CORESETs for RMSI in the cell. In FIG. 3C, each of four SS blocks indicates a configuration of two last and immediate CORESETs.

In this case, the number of bits that is necessary in the NR-PBCH is suppressed compared to the option 2. Furthermore, it is possible to flexibly indicate a CORESET per SS block. However, there is a case where, to learn CORESETs associated with different SS blocks, it is necessary to read the NR-PBCH. Furthermore, the number of bits that is necessary in the NR-PBCH increases compared to the option 1.

Thus, notifying CORESET configuration information increases the number of bits for notification in the NR-PBCH and/or increases UE processing.

The inventors of this application have focused upon that a bandwidth for which an NR-PDCH that carries RMSI can be scheduled does not need to be made wider than the minimum UE bandwidth, a relative position of a CORESET for each SS block is usually repeated, and the relative position of the CORESET for each SS block does not need to be completely flexibly instructed. In this regard, when an SCS of each SS block, an SCS of RMSI and the number of SS blocks to be actually transmitted are different, the relative position of the CORESET for each block is changed in some cases.

Hence, the inventors of this application have studied a method for configuring radio resources of CORESETs and/or NR-PDSCHs, and have conceived the present invention. This configuration method can suppress the number of bits for notification in the NR-PBCH while reserving flexibility of multiplexing of SS blocks and CORESETs according to various scenarios. As a result, it is possible to improve characteristics of the NR-PBCH that influence a coverage and/or measurement delay.

Embodiments according to the present invention will be described in detail below with reference to the drawings. A radio communication method according to each embodiment may be applied alone or may be applied in combination.

Radio Communication Method

First Embodiment

According to the first embodiment, a PBCH includes a bit (a CORESET configuration bit or a bit field) indicating a CORESET resource configuration.

When detecting an SS block, a UE detects an SS block index and a CORESET configuration bit from the SS block. The UE may recognize an actual CORESET resource configuration associated with SS block based on the CORESET configuration bit included in one PBCH. The UE monitors a PDCCH in the CORESET indicated by the recognized CORESET resource configuration.

To recognize the CORESET resource configuration, at least one of following examples 1 to 3 may be used.

Example 1

A plurality of patterns (relative position patterns) each indicating a relative positional relationship between a resource of an SS block and a resource of a CORESET are configured to the UE in advance. A plurality of patterns may be defined in a specification or may be updated by higher layer signaling (e.g., Radio Resource Control (RRC) signaling and/or broadcast information).

A radio base station notifies the UE of a pattern to be actually applied in a cell by using the CORESET configuration bit included in a PBCH. A CORESET configuration bit of each SS block in the cell may indicate a common value.

As illustrated in FIGS. 4A to 4D, each pattern may indicate relative positions of a plurality of CORESETs respectively associated with a plurality of SS blocks. For example, each pattern may indicate a relative position of the CORESET with respect to each SS block per SS block index. When detecting the SS block index and the CORESET configuration bit from the SS block, the UE may recognize a pattern associated with the detected CORESET configuration bit, and recognize the relative position of the CORESET with respect to the SS block of the detected SS block index from this pattern. The CORESET configuration bit and the pattern indicated by the CORESET configuration bit are not limited to those illustrated in FIGS. 4A to 4D, and may indicate another pattern or may use the number of bits of different CORESET configuration bits.

When a CORESET configuration bit length is 2, for example, the CORESET configuration bit indicates one of four patterns.

In FIGS. 4A to 4D, an SS block #0 (SS block index=0) is associated with a CORESET #0, and an SS block #1 (SS block index=1) is associated with a CORESET #1. The bandwidth of the CORESET is wider than the bandwidth of the SS block. The center frequency of the CORESET is equal to the center frequency of the SS block.

Figure 4A:
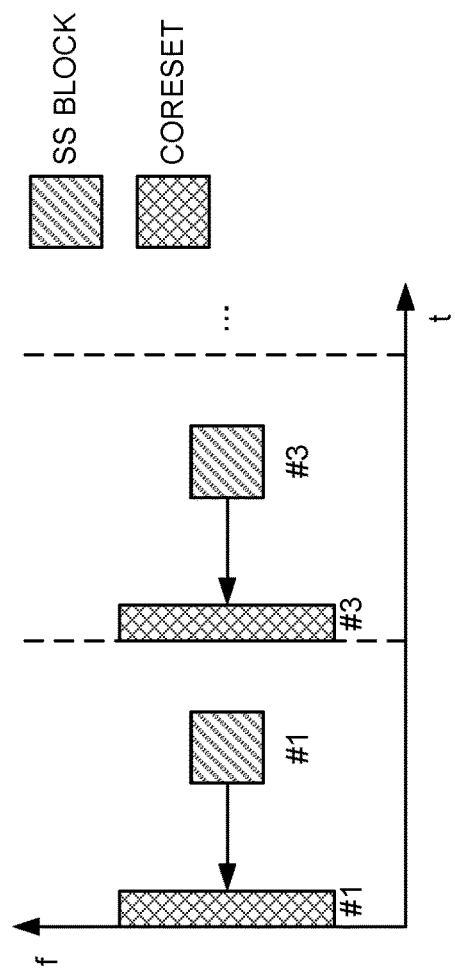
FIGS. 4A to 4D are diagrams illustrating one example of a pattern associated with a CORESET configuration bit.

FIG. 4A indicates a pattern associated with a CORESET configuration bit value 00.

In this pattern, time resources of CORESETS #0 and #1 are contiguous, and then time resources of the SS blocks #0 and #1 are contiguous. That is, according to this pattern, a plurality of SS blocks and a plurality of CORESETs are subjected to Time Division Multiplexing (TDM) in one slot.

Figure 4B:
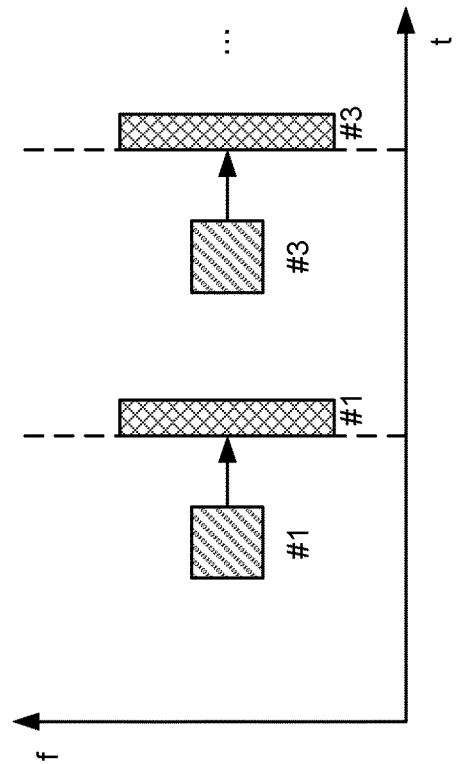

FIG. 4B indicates a pattern associated with a CORESET configuration bit value 10.

According to this pattern, the time resources of the SS blocks #0 and #1 are contiguous.

The time resource of the CORESET #0 and the time resource of the SS block #0 overlap. The CORESET #0 includes two resource domains including an identical time resource and different frequency resources. The one resource domain is positioned on a high frequency side of the SS block #0, and the other resource domain is positioned on a low frequency side of the SS block #0. That is, according to this pattern, the SS block and the CORESET are subjected to Frequency Division Multiplexing (FDM).

A relative position of the CORESET #1 with respect to the SS block #1 is the same as a relative position of the CORESET #0 with respect to the SS block #0.

Figure 4C:
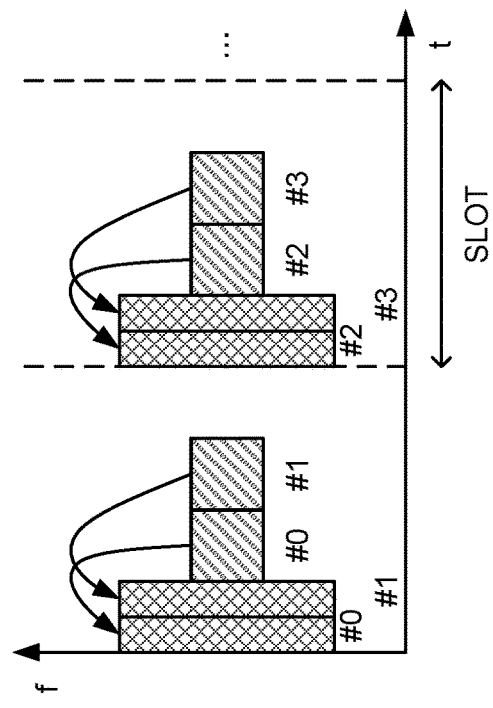

FIG. 4C indicates a pattern associated with a CORESET configuration bit value 01.

This pattern indicates only the relative position of the CORESET #1 with respect to the SS block #1. That is, the SS block may be arranged on a second (second half) time resource candidate of two time resource candidates (SS blocks #0 and #1) of the SS block in each slot. It has been studied to arrange a DMRS on the third symbol or a fourth symbol in the slot. When the first (first half) time resource candidate includes the third symbol or the fourth symbol, the SS block may use the second (second half) time resource candidate to avoid collision against the DMRS.

The time resource of the CORESET #1 is a head of a slot including the SS block #1. That is, this pattern has a limitation that the SS block and the CORESET are subjected to TDM in 1 slot, and the time resource of the CORESET is a head of the slot of the SS block.

Figure 4D:
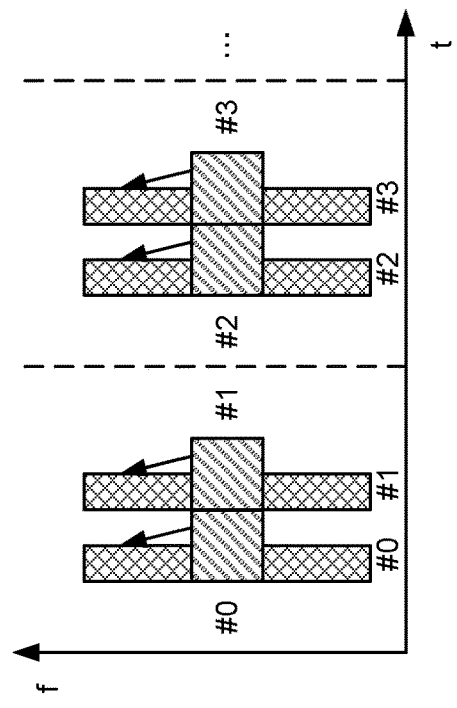

FIG. 4D indicates a pattern associated with a CORESET configuration bit value 11.

This pattern indicates only the relative position of the CORESET #1 with respect to the SS block #1. That is, similar to the pattern of the CORESET configuration bit value 01, the SS block may be arranged on the second (second half) time resource candidate of the two time resource candidates (SS blocks #0 and #1) of the SS block in each slot.

According to this pattern, the time resource of the CORESET #1 is a head of a next slot of the SS block #1. That is, this pattern has a limitation that the SS block and the CORESET are subjected to TDM in 1 slot, and the time resource of the CORESET is the head of the next slot in the SS block.

For example, a PDSCH in a head CORESET of the next slot of the SS block schedules RMSI in the rest of symbols of the slot.

When transmission is performed in a slot unit, it is possible to avoid collision between an SS block, and a PDCCH and a PDSCH by transmitting the PDCCH and the PDSCH in a slot different from that of the SS block.

By notifying a bit related to a CORESET configuration pattern instead of notifying an individual CORESET configuration on a PBCH, it is possible to suppress a notification overhead of the CORESET configuration.

The CORESET configuration bit in each SS block in the cell indicates the common value, so that the UE does not need to reread the CORESET configuration bit per SS block by reading the CORESET configuration bit of one SS block and, consequently, can suppress a processing load of the UE.

Furthermore, one pattern indicates the relative position of the CORESET per SS block index, so that it is possible to flexibly configure the CORESET associated with each SS block.

Example 2

Different patterns or CORESET resource configurations depending on SCSs of SS blocks (SS block SCSs) and/or frequency bands may be configured. For example, whether or not the frequency band is lower than a given frequency (e.g., 6 GHz) may be indicated.

A default value of at least one of the SS block SCS and a position (a time resource or a mapping pattern) of the SS block with respect to a slot may be defined per frequency band by a specification, or may be updated by higher layer signaling (e.g., RRC signaling and/or broadcast information). That is, the position of the SS block differs depending on the SS block SCS and/or the frequency band.

When recognizing a pattern associated with a CORESET configuration bit, the UE may recognize a different pattern or CORESET resource configuration according to the SS block SCS and/or the frequency band. In other words, the UE may change an interpretation of a CORESET configuration bit based on the SS block SCS and/or the frequency band.

Furthermore, a pattern that differs depending on the SS block SCS may be defined. A plurality of patterns are defined for each of cases where, for example, SS block SCSs are 15, 30, 120 and 240 kHz. The UE recognizes a pattern associated with a notified CORESET configuration bit among a plurality of patterns associated with the SS block SCSs.

It is possible to use a pattern associated with the SS block SCS and/or the frequency band, and consequently flexibly configure the CORESET resource configuration while suppressing a notification overhead of the CORESET resource configuration.

Example 3

Different patterns or CORESET resource configuration depending on at least one of SS block SCSs, frequency bands and data SCSs may be defined. The data SCS may be an SCS to be applied to at least one of a CORESET, RMSI (PDSCH) and Msg.2/4.

When recognizing a pattern associated with a CORESET configuration bit, the UE may recognize the different pattern or CORESET resource configuration according to at least one of the SS block SCS, the frequency band and the data SCS. In other words, the UE may change an interpretation of the CORESET configuration bit based on at least one of the SS block SCS, the frequency band and the data SCS.

Furthermore, the UE may recognize an actual CORESET resource configuration (a radio resource of the CORESET) associated with each SS block based on at least one of the SS block index, the data SCS, the SS block SCS and the frequency band, and the CORESET configuration bit included in one PBCH. Furthermore, each pattern may be associated with at least one of the SS block index, the data SCS, the SS block SCS and the frequency band, and the CORESET configuration bit.

The PBCH may include a bit (bit field) indicating the data SCS. The UE may recognize the different pattern or CORESET resource configuration according to the bit indicating the data SCS.

For example, the UE determines the pattern associated with the SS block SCS and the CORESET configuration bit, and determines a position of the CORESET associated with the bit indicating the data SCS, and the SS block index from this pattern.

A UE operation in a case where, for example, the CORESET configuration bit is a given value, the SS block SCS is 15 kHz and the pattern associated with these values is that illustrated in FIG. 5 will be described. Similar to this FIG. 5, a pattern associated with another value of the CORESET configuration bit and another value of the SS block SCS may be defined.

Figure 5:
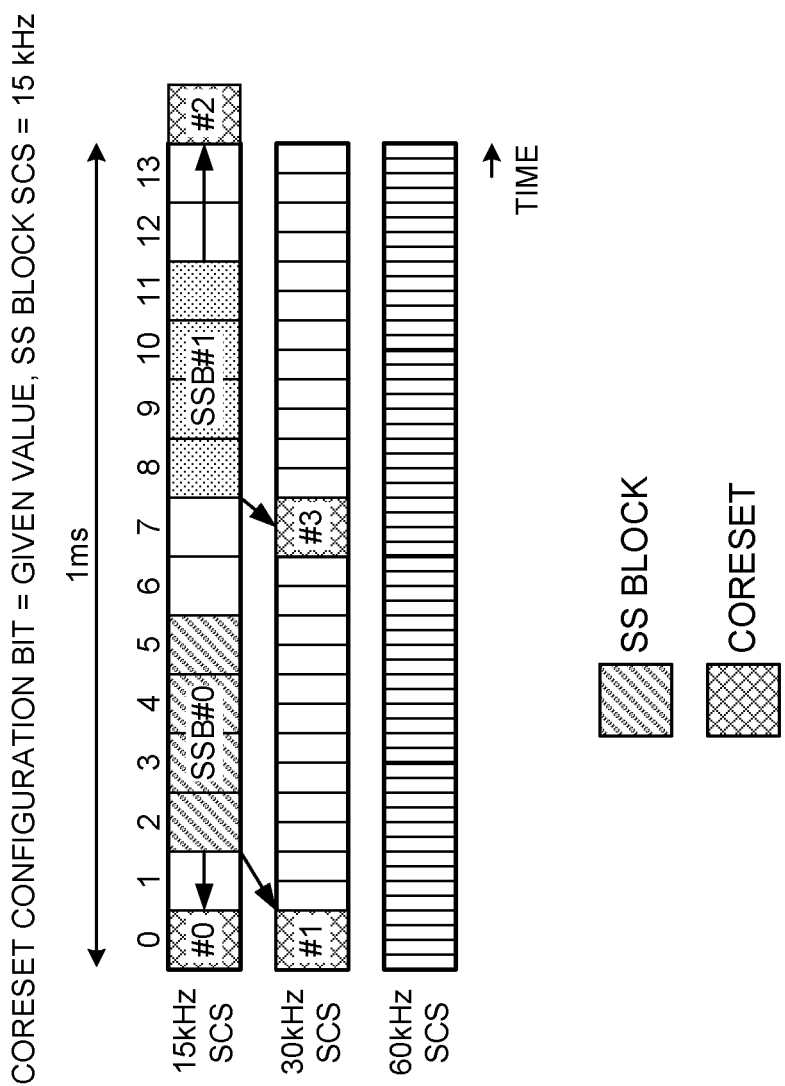
FIG. 5 is a diagram illustrating one example of a pattern in a case where an SS block SCS is 15 kHz.

When, for example, the SS block index is 0 and the data SCS indicated by the PBCH is 15 kHz, the UE determines the CORESET #0 whose data SCS is 15 kHz as the position of the CORESET associated with the SS block (SSB) #0 based on the pattern in FIG. 5.

When, for example, the SS block index is 0 and the data SCS indicated by the PBCH is 30 kHz, the UE determines the CORESET #1 whose data SCS is 30 kHz as the position of the CORESET associated with the SS block (SSB) #0 based on the pattern in FIG. 5.

When, for example, the SS block index is 1 and the data SCS indicated by the PBCH is 15 kHz, the UE determines the CORESET #2 whose data SCS is 15 kHz as the position of the CORESET associated with the SS block (SSB) #1 based on the pattern in FIG. 5.

When, for example, the SS block index is 1 and the data SCS indicated by the PBCH is 30 kHz, the UE determines the CORESET #3 whose data SCS is 30 kHz as the position of the CORESET associated with the SS block (SSB) #1 based on the pattern in FIG. 5.

Different CORESET resource configurations depending on data SCSs are defined, so that, even when a plurality of data SCSs are used, it is possible to flexibly configure the CORESET resource configurations, and suppress a notification overhead of the CORESET resource configurations.

Second Embodiment

According to the second embodiment, a UE assumes that, when a DL BWP is not configured, a PDCCH in a CORESET indicated by a PBCH schedules a PDSCH resource by using a frequency index based on an SS block or a CORESET.

A frequency index may be an RB index in a band of a minimum UE bandwidth or a band of the CORESET, or may be an index of a frequency resource in another unit such as a subcarrier.

The PDSCH that is scheduled by the PDCCH transmitted in the CORESET may include only a PDSCH that carries RMSI or a PDSCH that carries RSMI and Msg.2/4.

When, for example, a DL BWP is not configured to the UE, the PDCCH indicates the frequency resource of the PDSCH by using the frequency index in a band (allocable band) for which the PDSCH can be scheduled, and the center of the allocable band is a center of the band of the SS block or the CORESET.

When the DL BWP is configured to the UE, the UE may assume that the band for which the PDSCH can be scheduled is the DL BWP, and recognize a frequency to which the PDSCH has been allocated by using the frequency index of the DL BWP.

To recognize the frequency index for scheduling of the PDSCH, at least one of following examples 1 to 4 may be used.

Example 1

Figure 6A:
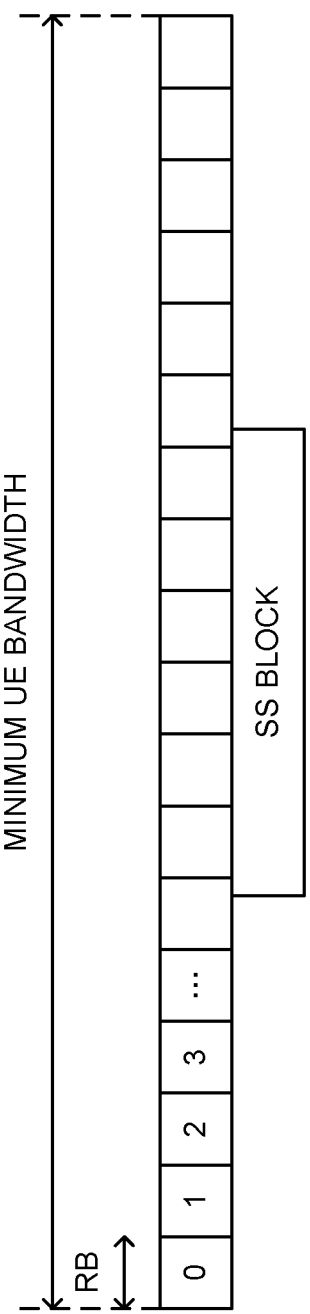
FIGS. 6A to 6C are diagrams illustrating one example of RB indexing.

When, for example, an initial access is made, i.e., when the DL BWP is not configured, as illustrated in FIG. 6A, the UE may use the center (center frequency) of the band of the detected SS block as the center (center frequency) of the allocable band, use the minimum UE bandwidth as the bandwidth of the allocatable band, and assume an RB index (RB indexing) of the allocable band. The minimum UE bandwidth may be defined per frequency band by a specification.

The PDCCH indicates the frequency resource allocated to the PDSCH by using the RB index. The UE recognizes the frequency resource of the PDSCH by using the RB index indicated by the PDCCH.

For example, the SS block is arranged near a boundary of a carrier band, and part of a band to which the RB index is given is positioned outside the carrier band in some cases. Even in this case, the PDSCH is not allocated to an RB positioned outside the carrier band, so that any problem does not occur.

Although the boundary of the RB in the SS block may match with a boundary of the RB in data (PDSCH), the boundary of the RB in the SS block does not match with the boundary of the RB in the data in some cases. In this case, it has been studied to notify a mismatch in subcarrier units between the RB of the SS block and the RB of the data by the PBCH. In this regard, the RB positioned at an end of the band of the minimum UE bandwidth is not completely included in the band in some cases. In this case, the RB index may be given only to an RB that is completely included in the band of the minimum UE bandwidth, or the RB index may be given to the RB included even in part of the band of the minimum UE bandwidth.

Even when the DL BWP is not configured, the UE that supports a wider bandwidth than the minimum UE bandwidth can restrict the bandwidth for which the PDSCH can be scheduled, to the minimum UE bandwidth. Consequently, it is possible to suppress the number of bits that is necessary for the RB index indicating scheduling of the PDSCH. Furthermore, the UE does not need to receive the entire carrier bandwidth, and consequently can suppress power consumption. Furthermore, by assuming that the band for which the PDSCH can be scheduled is the minimum UE bandwidth, it is not necessary to notify the band for which the PDSCH can be scheduled, so that it is possible to suppress a notification overhead.

Example 2

Figure 6B:
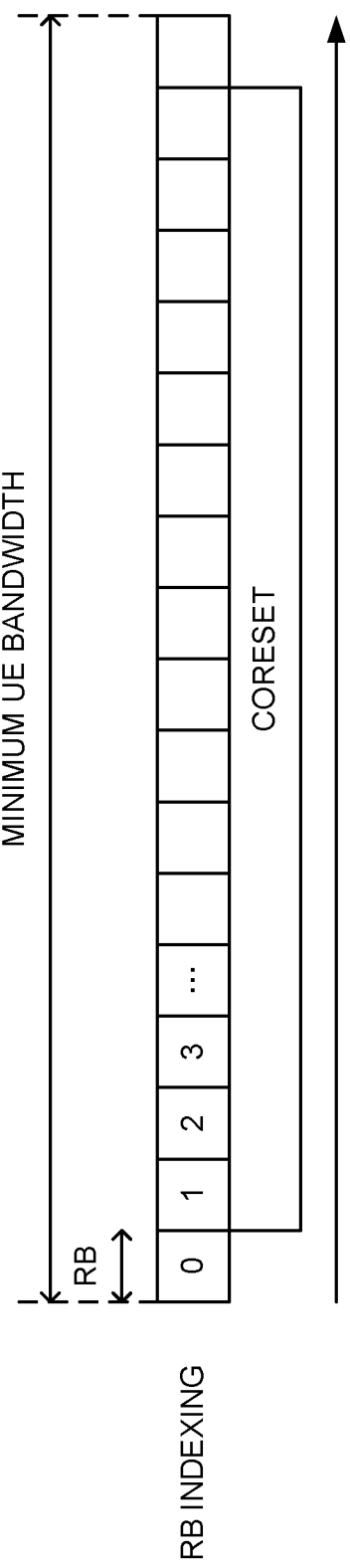

When, for example, an initial access is made, i.e., when the DL BWP is not configured, as illustrated in FIG. 6B, the UE may use the center of the band of the CORESET indicated by the PBCH as the center of the allocatable band, use the minimum UE bandwidth as the bandwidth of the allocatable band, and assume an RB index of the allocatable band. That is, as the center of the allocatable band, the center of the band of the CORESET is used instead of the center of the band of the SS block in the example 1. The center of the band of the CORESET may be equal to the center of the band of the SS block.

The center of the band of the CORESET may be different from the center of the band of the SS block. The PBCH may indicate a misalignment of the center of the CORESET with respect to the center of the band of the SS block. When the center of the band of the CORESET is different from the center of the band of the SS block, the center of the band of the CORESET may be the center of the band of the minimum UE bandwidth.

Even when the DL BWP is not configured, the UE that supports a wider bandwidth than the minimum UE bandwidth can restrict the bandwidth for which the PDSCH can be scheduled, to the minimum UE bandwidth. Consequently, it is possible to suppress the number of bits that is necessary for the RB index indicating scheduling of the PDSCH. Furthermore, the UE does not need to receive the entire carrier bandwidth, and consequently can suppress power consumption. Furthermore, by assuming that the band for which the PDSCH can be scheduled is the CORESET band, it is not necessary to notify the band for which the PDSCH can be scheduled, so that it is possible to suppress a notification overhead.

Example 3

Figure 6C:
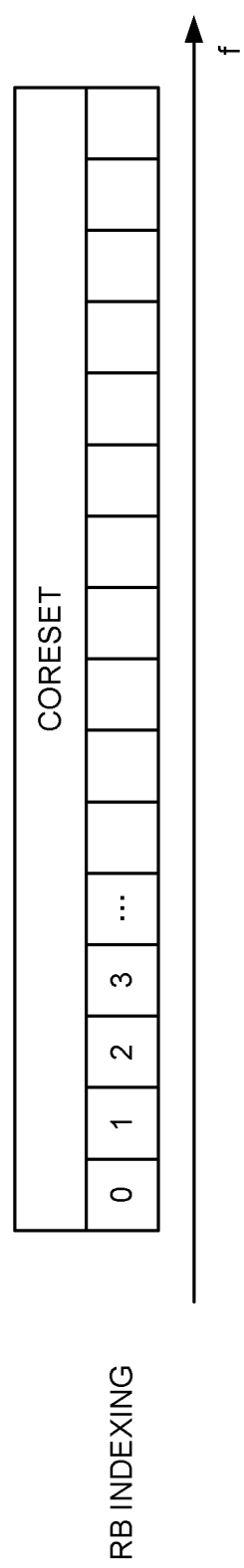

When, for example, an initial access is made, i.e., when a DL BWP is not configured, as illustrated in FIG. 6C, the UE may use the band of the CORESET indicated by the PBCH as an allocatable band, and assume an RB index of the allocatable band. That is, as the bandwidth of the allocatable band, the bandwidth of the CORESET is used instead of the minimum UE bandwidth in the example 2. The center of the band of the CORESET may be equal to the center of the band of the SS block.

The center of the band of the CORESET may be different from the center of the band of the SS block. The PBCH may indicate a misalignment of the center of the band of the CORESET with respect to the center of the band of the SS block. When the center of the band of the CORESET is different from the center of the band of the SS block, the center of the band of the CORESET may be the center of the band of the minimum UE band.

Even when the DL BWP is not configured, the UE that supports a wider bandwidth than the minimum UE bandwidth can restrict the bandwidth for which the PDSCH can be scheduled, to the CORESET bandwidth narrower than the minimum UE bandwidth. Consequently, it is possible to suppress the number of bits that is necessary for the RB index indicating scheduling of the PDSCH. Furthermore, the UE does not need to receive the entire carrier bandwidth, and consequently can suppress power consumption. Furthermore, by assuming that the band for which the PDSCH can be scheduled is the CORESET band, it is not necessary to notify the band for which the PDSCH can be scheduled, so that it is possible to suppress a notification overhead.

Example 4

Figure 7:
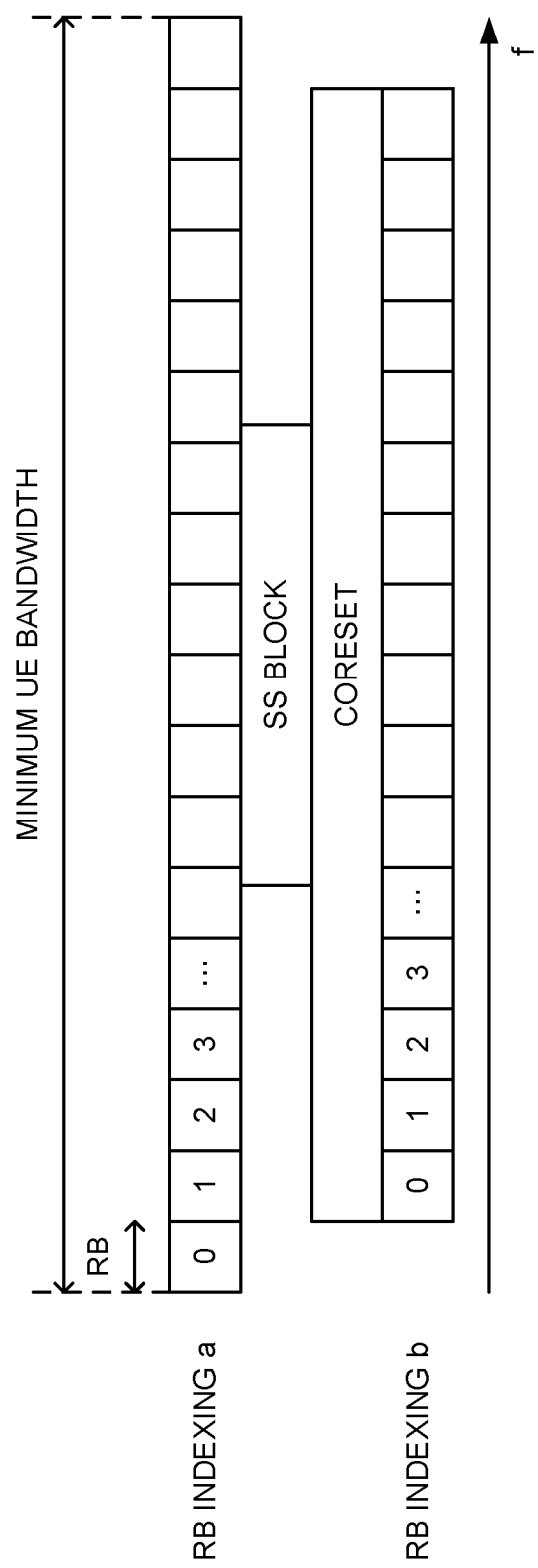
FIG. 7 is a diagram illustrating one example of RB indexing based on a minimum UE bandwidth, and RB indexing based on a CORESET bandwidth.

As illustrated in FIG. 7, the PBCH may include a bit (bit field) indicating whether the RB index is given to the band of the minimum UE bandwidth (RB indexing a) or the RB index is given to the band of the CORESET (RB indexing b).

The UE may use the band of the minimum UE bandwidth or the band of the CORESET as the allocatable band based on this bit, and assume the RB index in the allocatable band. In other words, the UE determines whether to use the bandwidth for which the PDSCH can be scheduled as the minimum UE bandwidth or the CORESET bandwidth based on this bit.

Instead of notifying the bandwidth for which the PDSCH can be scheduled, only 1 bit indicating whether to use the minimum UE bandwidth or to use the CORESET bandwidth needs to be notified, so that it is possible to suppress a notification overhead. Furthermore, it is possible to select the minimum UE bandwidth and the CORESET bandwidth and consequently flexibly configure the bandwidth for which the PDSCH can be scheduled.

(Radio Communication System)

The configuration of the radio communication system according to one embodiment of the present invention will be described below. This radio communication system uses one or a combination of the radio communication method according to each of the above embodiments of the present invention to perform communication.

Figure 8:
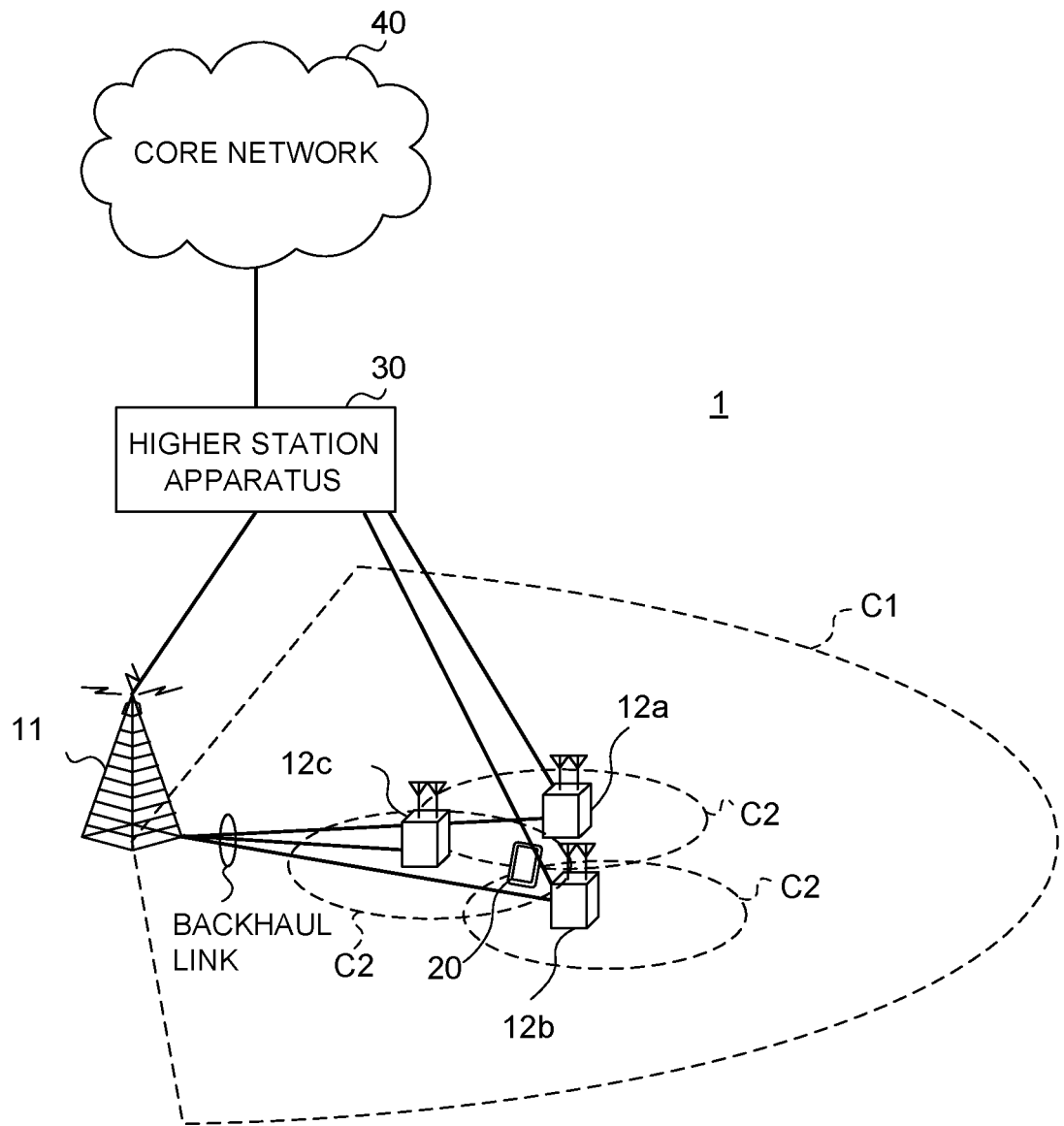
FIG. 8 is a diagram illustrating one example of a schematic configuration of a radio communication system according to one embodiment of the present invention.

FIG. 8 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to those illustrated in FIG. 8.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are transmitted on the PDSCH. Furthermore, Master Information Blocks (MIBs) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARD) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with a cell is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

<Radio Base Station>

Figure 9:
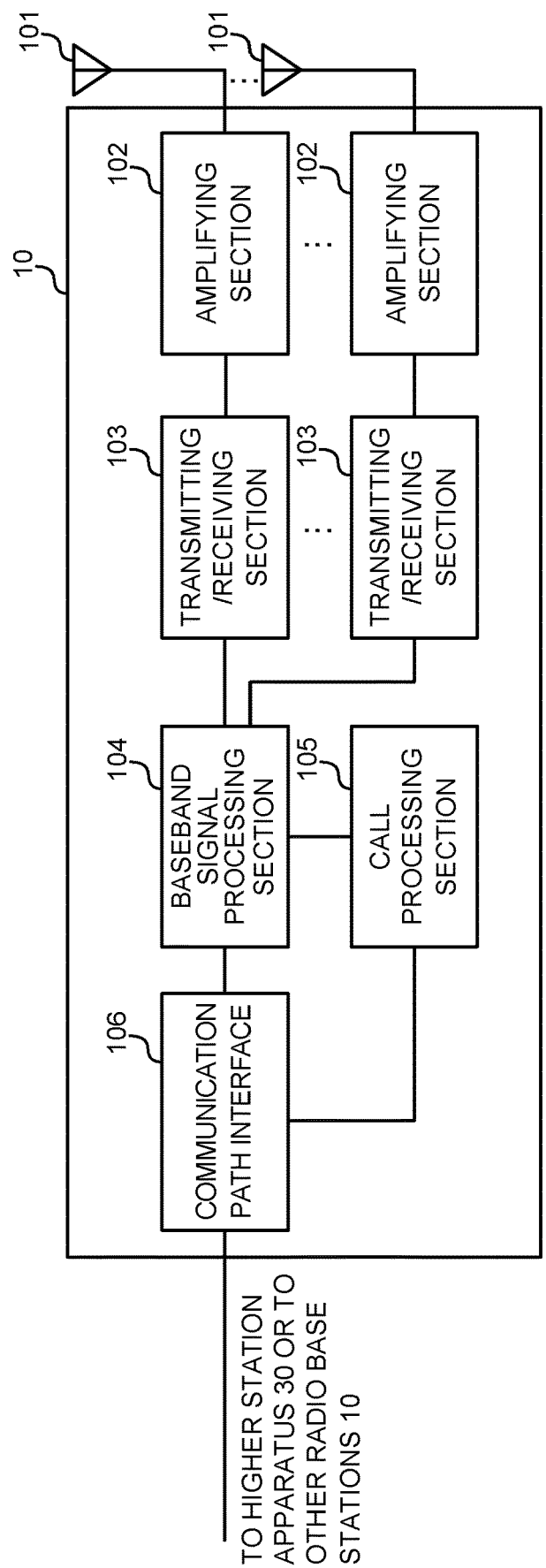
FIG. 9 is a diagram illustrating one example of an overall configuration of a radio base station according to the one embodiment of the present invention.

FIG. 9 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmission/reception section 103 may transmit a synchronization signal block (e.g., an SS block or an NR-PBCH in the SS block) including configuration information (e.g., CORESET configuration bit) indicating a configuration of a control resource set (e.g., CORESET).

Figure 10:
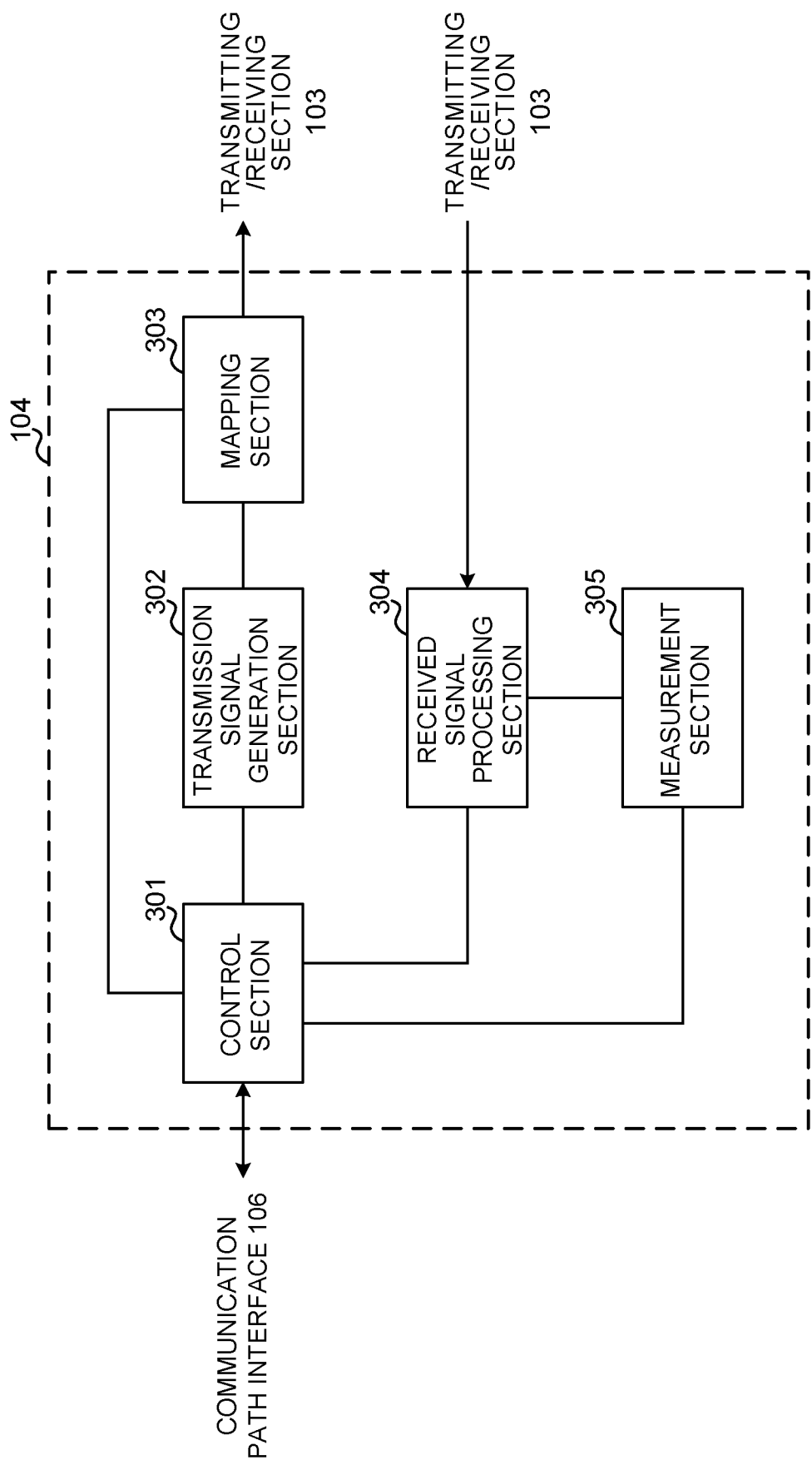
FIG. 10 is a diagram illustrating one example of a function configuration of the radio base station according to the one embodiment of the present invention.

FIG. 10 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and a downlink reference signal (e.g., a CRS, a CSI-RS or a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., a Received Signal Strength Indicator (RSSI)) or channel information (e.g., CSI). The measurement section 305 may output a measurement result to the control section 301.

<User Terminal>

Figure 11:
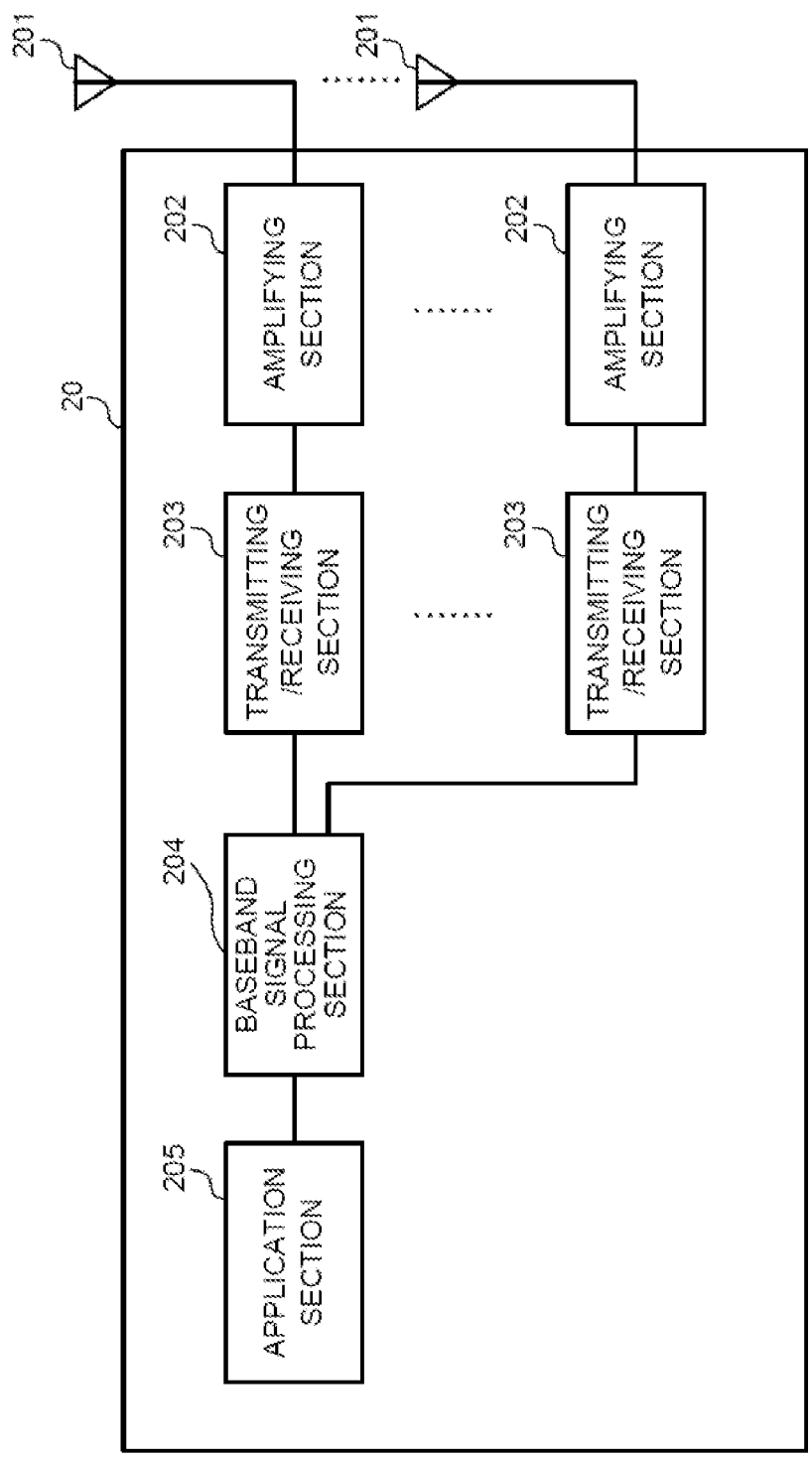
FIG. 11 is a diagram illustrating one example of an overall configuration of a user terminal according to the one embodiment of the present invention.

FIG. 11 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 may receive a synchronization signal block (e.g., an SS block and an NR-PBCH in the SS block) including configuration information (e.g., CORESET configuration bit) indicating a configuration of a control resource set (e.g., CORESET).

Figure 12:
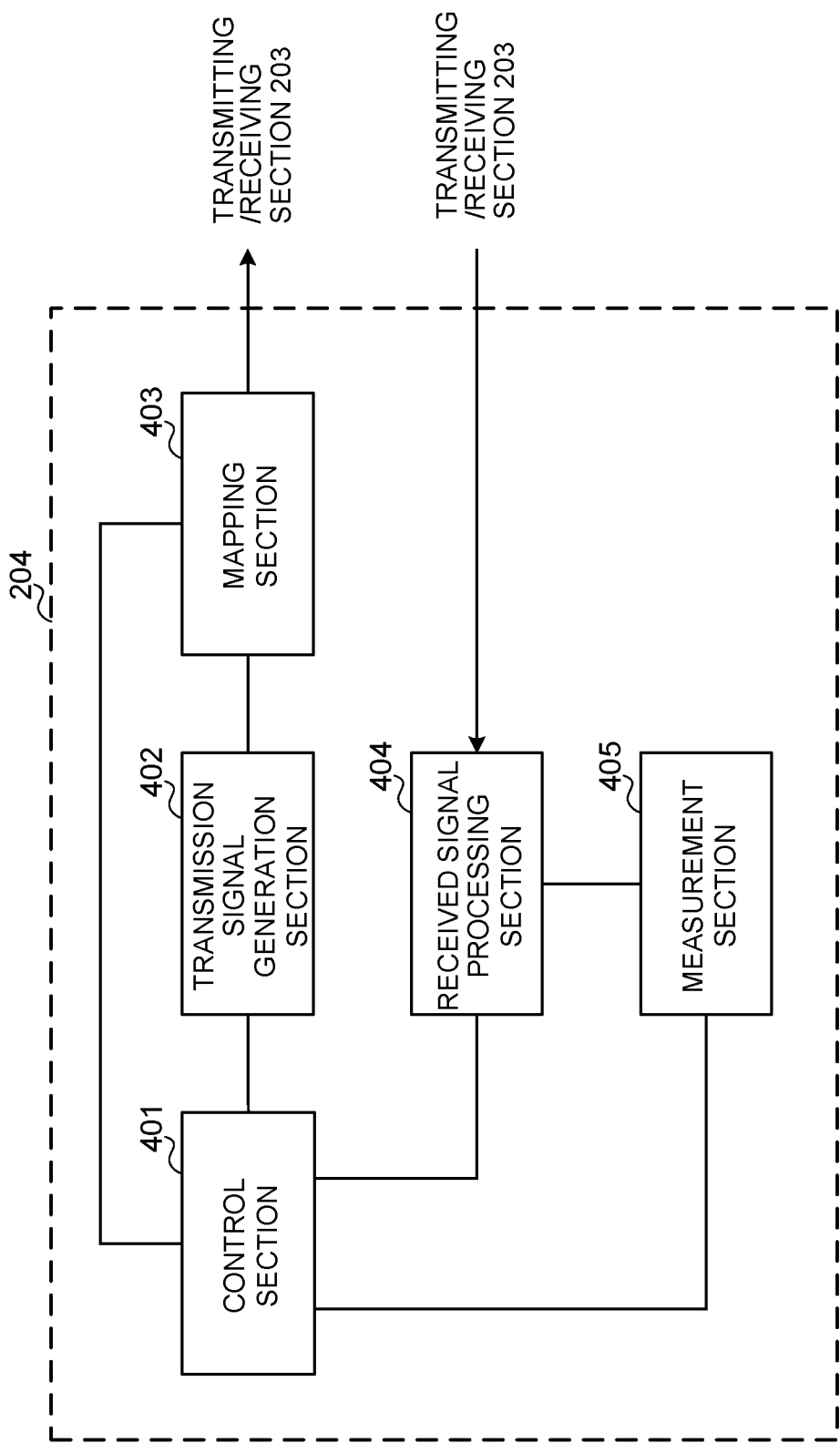
FIG. 12 is a diagram illustrating one example of a function configuration of the user terminal according to the one embodiment of the present invention.

FIG. 12 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

Furthermore, when obtaining, from the received signal processing section 404, various pieces of information notified from the radio base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

Furthermore, the control section 401 may control determination of radio resources of control resource sets based on at least one of identification information (e.g., SS block index) of a synchronization signal block (e.g., SS block), a subcarrier spacing of a downlink data channel (e.g., NR-PDSCH) scheduled by a downlink control channel (e.g., NR-PDCCH) in a control resource set (e.g., CORESET), a subcarrier spacing of the synchronization signal block and a frequency band, and configuration information (e.g., CORESET configuration bit).

Furthermore, a plurality of patterns each indicating a relative position of a radio resource of a control resource set for a radio resource of the synchronization signal block may be configured. The control section 401 may determine a pattern associated with at least one of the identification information of the synchronization signal block, the subcarrier spacing of the downlink data channel, the subcarrier spacing of the synchronization signal block and the frequency band, and the configuration information.

Furthermore, a plurality of synchronization signal blocks may include identical configuration information (a common value of CORESET configuration bits).

Furthermore, when a part band (e.g., DL BWP) for downlink is not configured to the user terminal 20, a downlink control channel may indicate a frequency resource of the downlink data channel by using a frequency index (e.g., RB index) in a band (e.g., allocatable band) for which the downlink data channel can be scheduled, and the center of the band may be the center of the band of the synchronization signal block or the control resource set.

Furthermore, the bandwidth of the band may be one of a minimum bandwidth (e.g., minimum UE bandwidth) supported by a plurality of types of user terminals, and a bandwidth of the control resource set.

Furthermore, the synchronization signal block (e.g., the SS block or the NR-PBCH in the SS block) may indicate one of the minimum bandwidth (e.g., minimum UE bandwidth) supported by a plurality of types of user terminals, and the bandwidth of the control resource set.

<Hardware Configuration>

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 13:
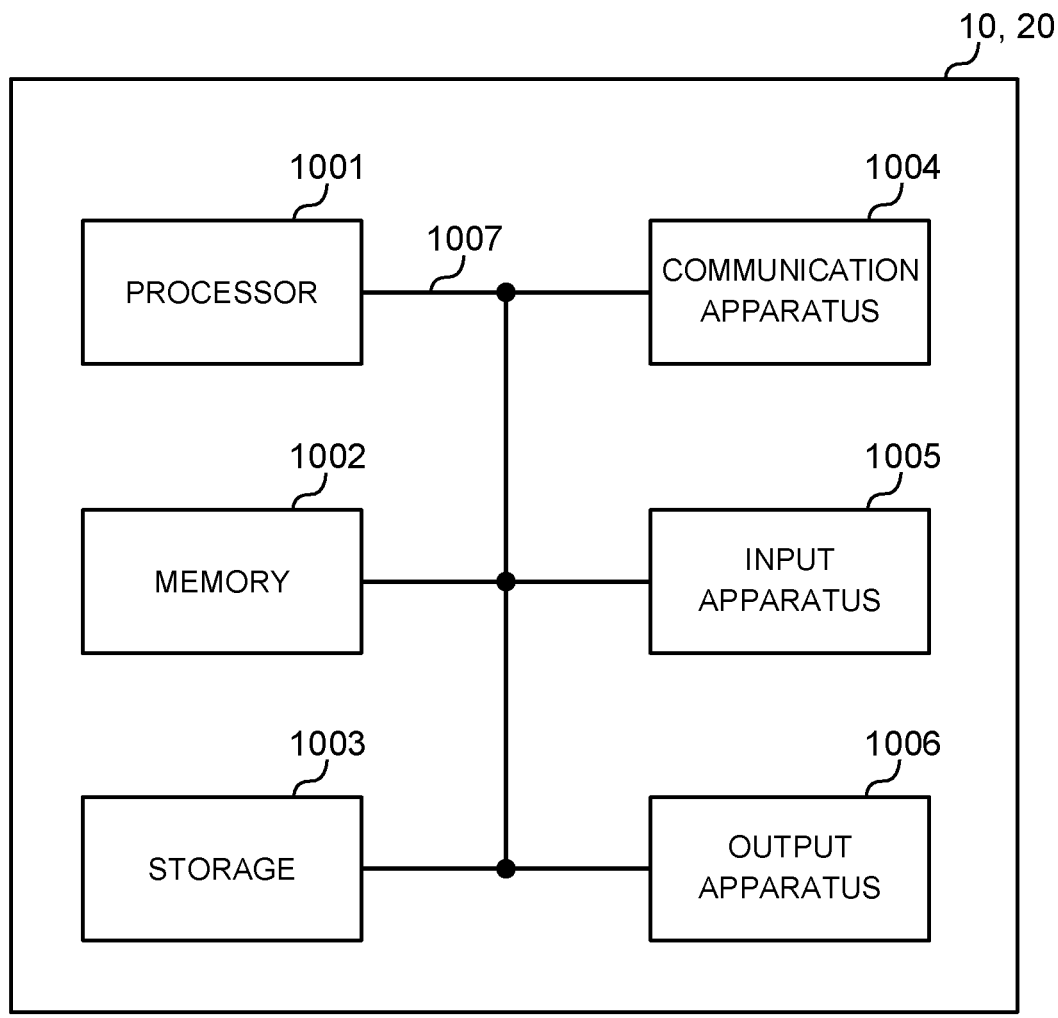
FIG. 13 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 13 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or processing may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a sub slot.

The radio frame, the subframe, the slot, the mini slot and the symbol each indicate a time unit for transmitting signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspects/embodiments described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed by 1 bit, may be made based on a boolean expressed by true or false or may be made by comparing numerical values (e.g., comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The invention claimed is:

1. A terminal comprising:
a receiver that detects a synchronization signal (SS)/physical broadcast channel (PBCH) block including an SS and a PBCH; and
a processor that determines a control resource set for monitoring a downlink control channel based on a field in the PBCH, a first subcarrier spacing of the SS/PBCH block, a second subcarrier spacing of the control resource set, a frequency band, and an index of the SS/PBCH block,
wherein an allocatable band of a downlink shared channel starts from a resource block corresponding to a lowest frequency of the control resource set, a width of the allocatable band is equal to a bandwidth of the control resource set, and the downlink control channel indicates one or more resource blocks assigned to the downlink shared channel within the allocatable band by using a resource block index which starts from the resource block corresponding to the lowest frequency of the control resource set.

2. The terminal according to claim 1, wherein the control resource set is associated with the SS/PBCH block.

3. The terminal according to claim 1,
wherein the processor determines one pattern out of a plurality of patterns that indicate a positional relationship between the SS/PBCH block and the control resource set, based on the field and at least one of the first subcarrier spacing, the second subcarrier spacing, and the frequency band,
wherein the plurality of patterns comprises:
a first pattern in which the SS/PBCH block and the control resource set are time-division multiplexed; and
a second pattern in which the SS/PBCH block and the control resource set are frequency-division multiplexed.

4. The terminal according to claim 1, wherein the second subcarrier spacing is provided by the PBCH.

5. The terminal according to claim 2,
wherein the processor determines one pattern out of a plurality of patterns that indicate a positional relationship between the SS/PBCH block and the control resource set, based on the field and at least one of the first subcarrier spacing, the second subcarrier spacing, and the frequency band,
wherein the plurality of patterns comprises:
a first pattern in which the SS/PBCH block and the control resource set are time-division multiplexed; and
a second pattern in which the SS/PBCH block and the control resource set are frequency-division multiplexed.

6. The terminal according to claim 2, wherein the second subcarrier spacing is provided by the PBCH.

7. The terminal according to claim 3, wherein the second subcarrier spacing is provided by the PBCH.

8. A radio communication method for a terminal comprising:
detecting a synchronization signal (SS)/physical broadcast channel (PBCH) block including an SS and a physical broadcast channel PBCH; and
determining a control resource set for monitoring a downlink control channel based on a field in the PBCH, a first subcarrier spacing of the SS/PBCH block, a second subcarrier spacing of the control resource set, a frequency band, and an index of the SS/PBCH block,
wherein an allocatable band of a downlink shared channel starts from a resource block corresponding to a lowest frequency of the control resource set, a width of the allocatable band is equal to a bandwidth of the control resource set, and the downlink control channel indicates one or more resource blocks assigned to the downlink shared channel within the allocatable band by using a resource block index which starts from the resource block corresponding to the lowest frequency of the control resource set.

9. A base station comprising:
a transmitter that transmits a synchronization signal (SS)/physical broadcast channel (PBCH) block including an SS and a PBCH; and
a processor that allocates a downlink control channel to a control resource set for monitoring the downlink control channel based on a field in the PBCH, a first subcarrier spacing of the SS/PBCH block, a second subcarrier spacing of the control resource set, a frequency band, and an index of the SS/PBCH block, wherein an allocatable band of a downlink shared channel starts from a resource block corresponding to a lowest frequency of the control resource set, a width of the allocatable band is equal to a bandwidth of the control resource set, and the downlink control channel indicates one or more resource blocks assigned to the downlink shared channel within the allocatable band by using a resource block index which starts from the resource block corresponding to the lowest frequency of the control resource set.

10. A system comprising:

a terminal that comprises:

a receiver that detects a synchronization signal (SS)/ physical broadcast channel (PBCH) block including an SS and a PBCH; and a processor that determines a control resource set for monitoring a downlink control channel based on a field in the PBCH, a first subcarrier spacing of the SS/PBCH block, a second subcarrier spacing of the control resource set, a frequency band, and an index of the SS/PBCH block, wherein an allocatable band of a downlink shared channel starts from a resource block corresponding to a lowest frequency of the control resource set, a width of the allocatable band is equal to a bandwidth of the control resource set, and the downlink control channel indicates one or more resource blocks assigned to the downlink shared channel within the allocatable band by using a resource block index which starts from the resource block corresponding to the lowest frequency of the control resource set; and a base station that transmits the SS/PBCH block.

\* \* \* \* \*